US011181269B2

(12) United States Patent
Boardman et al.

(10) Patent No.: US 11,181,269 B2
(45) Date of Patent: Nov. 23, 2021

(54) INVOLUTE TRAPPED VORTEX COMBUSTOR ASSEMBLY

(71) Applicant: General Electric Company, Schenectady, NY (US)

(72) Inventors: Gregory Allen Boardman, Liberty Township, OH (US); Pradeep Naik, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 138 days.

(21) Appl. No.: 16/191,850

(22) Filed: Nov. 15, 2018

(65) Prior Publication Data
US 2020/0158342 A1    May 21, 2020

(51) Int. Cl.
| F23R 3/06 | (2006.01) |
| F23R 3/54 | (2006.01) |
| F23R 3/00 | (2006.01) |
| F23R 3/28 | (2006.01) |
| F23R 3/12 | (2006.01) |

(52) U.S. Cl.
CPC ............. *F23R 3/002* (2013.01); *F23R 3/06* (2013.01); *F23R 3/12* (2013.01); *F23R 3/286* (2013.01); *F23R 3/54* (2013.01); *F23R 2900/00015* (2013.01)

(58) Field of Classification Search
CPC .... F23R 3/06; F23R 3/58; F23R 3/002; F23R 2900/00015; F23R 3/54; F23R 3/12; F23R 3/34; F23R 3/346; F23R 3/04; F23R 3/045; F23M 5/08; F23M 5/085
See application file for complete search history.

(56) References Cited

U.S. PATENT DOCUMENTS

| 2,916,878 A | * | 12/1959 | Wirt ........................ F23R 3/04 |
| | | | 60/759 |
| 4,543,781 A | | 10/1985 | Rice |
| 4,586,328 A | | 5/1986 | Howald |
| (Continued) | | | |

FOREIGN PATENT DOCUMENTS

| CN | 103273156 A | 9/2013 |
| CN | 106271214 A | 1/2017 |
| (Continued) | | |

OTHER PUBLICATIONS

U.S. Appl. No. 15/793,129, filed Oct. 25, 2017.
(Continued)

*Primary Examiner* — Todd E Manahan
*Assistant Examiner* — Todd N Jordan
(74) *Attorney, Agent, or Firm* — Venable LLP; Edward A. Kmett; Michele V. Frank

(57) ABSTRACT

A gas turbine engine including a trapped vortex combustor assembly is generally provided. The combustor assembly includes an inner liner wall extended annularly around a combustor centerline, and an outer liner wall extended annularly around the combustor centerline. The inner liner wall and the outer liner wall together define an involute wall extended at least partially as a spiral curve from a circumferential reference line around the combustor centerline. The involute wall defines an involute combustion chamber. One or more of the inner liner wall and the outer liner wall each define a first dilution opening and a shaped dilution opening.

18 Claims, 4 Drawing Sheets

(56) References Cited

U.S. PATENT DOCUMENTS

| | | | |
|---|---|---|---|
| 4,689,961 A | 9/1987 | Stratton | |
| 4,700,544 A | 10/1987 | Fucci | |
| 4,787,208 A | 11/1988 | DeCorso | |
| 4,845,941 A | 7/1989 | Paul | |
| 4,910,957 A | 3/1990 | Moreno et al. | |
| 4,928,481 A | 5/1990 | Joshi et al. | |
| 5,026,273 A | 6/1991 | Cornelison | |
| 5,165,226 A | 11/1992 | Newton et al. | |
| 5,207,064 A | 5/1993 | Ciokajlo et al. | |
| 5,289,686 A | 3/1994 | Razdan et al. | |
| 5,321,948 A | 6/1994 | Leonard | |
| 5,511,375 A | 4/1996 | Joshi et al. | |
| 5,619,855 A | 4/1997 | Burrus | |
| 5,622,054 A | 4/1997 | Tingle | |
| 5,996,351 A | 12/1999 | Feitelberg et al. | |
| 6,098,397 A | 8/2000 | Glezer et al. | |
| 6,101,814 A | 8/2000 | Hoke et al. | |
| 6,220,035 B1 | 4/2001 | Lenertz et al. | |
| 6,240,731 B1 | 6/2001 | Hoke et al. | |
| 6,286,298 B1 | 9/2001 | Burrus et al. | |
| 6,295,801 B1 | 10/2001 | Burrus et al. | |
| 6,314,716 B1 | 11/2001 | Abreu et al. | |
| 6,351,949 B1 | 3/2002 | Rice et al. | |
| 6,412,282 B1 | 7/2002 | Willis | |
| 6,415,594 B1 | 7/2002 | Durbin et al. | |
| 6,460,339 B2 | 10/2002 | Nishida et al. | |
| 6,513,331 B1 | 2/2003 | Brown et al. | |
| 6,951,108 B2 | 10/2005 | Burrus et al. | |
| 6,966,186 B2 | 11/2005 | Bachovchin et al. | |
| 7,003,961 B2 | 2/2006 | Kendrick et al. | |
| 7,260,936 B2 | 8/2007 | Patel et al. | |
| 7,318,317 B2 | 1/2008 | Carrea | |
| 7,363,763 B2 | 4/2008 | Coughlan, III et al. | |
| 7,416,108 B2 | 8/2008 | Philip | |
| 7,465,423 B2 | 12/2008 | Raybould et al. | |
| 7,549,294 B2 | 6/2009 | Buret et al. | |
| 7,653,996 B2 | 2/2010 | Jungbluth et al. | |
| 7,677,026 B2 | 3/2010 | Conete et al. | |
| 7,886,539 B2 | 2/2011 | Cai | |
| 7,891,194 B2 | 2/2011 | Biebel et al. | |
| 7,895,841 B2 | 3/2011 | Johnson et al. | |
| 7,942,006 B2 | 5/2011 | Critchley et al. | |
| 7,954,325 B2 | 6/2011 | Burd et al. | |
| 7,967,183 B2 | 6/2011 | Goldschmidt et al. | |
| 7,984,615 B2 | 7/2011 | Woodcock et al. | |
| 8,141,769 B2 | 3/2012 | Ott et al. | |
| 8,161,751 B2 | 4/2012 | Hall | |
| 8,171,740 B2 | 5/2012 | Bronson et al. | |
| 8,272,219 B1 | 9/2012 | Johnson et al. | |
| 8,316,644 B2 | 11/2012 | Wilbraham | |
| 8,511,087 B2 | 8/2013 | Fox et al. | |
| 8,528,337 B2 | 9/2013 | Berry et al. | |
| 8,555,500 B2 | 10/2013 | Vossberg et al. | |
| 8,616,004 B2* | 12/2013 | Zupanc | F23R 3/06 60/754 |
| 8,701,416 B2 | 4/2014 | Teets | |
| 8,739,546 B2 | 6/2014 | Snyder et al. | |
| 8,745,989 B2 | 6/2014 | Prociw et al. | |
| 8,776,525 B2 | 7/2014 | Oechsle | |
| 8,864,492 B2 | 10/2014 | Shi et al. | |
| 8,881,965 B2 | 11/2014 | Stankowski et al. | |
| 8,910,481 B2 | 12/2014 | Kim et al. | |
| 8,938,971 B2 | 1/2015 | Poyyapakkam et al. | |
| 8,973,367 B2 | 3/2015 | Bottcher et al. | |
| 9,038,392 B2 | 5/2015 | Yuasa et al. | |
| 9,074,764 B2 | 7/2015 | Hull et al. | |
| 9,074,773 B2 | 7/2015 | Boardman et al. | |
| 9,080,770 B2 | 7/2015 | Dudebout et al. | |
| 9,121,613 B2* | 9/2015 | Carnell, Jr. | F23R 3/42 |
| 9,151,223 B2 | 10/2015 | Negulescu | |
| 9,151,501 B2 | 10/2015 | Negulescu | |
| 9,175,857 B2 | 11/2015 | Melton et al. | |
| 9,222,674 B2 | 12/2015 | Cunha et al. | |
| 9,227,274 B1 | 1/2016 | Balachandra et al. | |
| 9,243,801 B2 | 1/2016 | Cunha et al. | |
| 9,322,554 B2 | 4/2016 | Kim et al. | |
| 9,400,110 B2 | 7/2016 | Dudebout et al. | |
| 9,599,342 B2 | 3/2017 | Leblond et al. | |
| 9,625,153 B2* | 4/2017 | Beran | F23R 3/002 |
| 9,625,156 B2 | 4/2017 | Rudrapatna et al. | |
| 9,845,693 B2 | 12/2017 | Spangler | |
| 9,939,154 B2 | 4/2018 | Cunha | |
| 10,386,070 B2* | 8/2019 | Sandoval | F23R 3/002 |
| 2002/0108374 A1 | 8/2002 | Young et al. | |
| 2005/0081526 A1 | 4/2005 | Howell et al. | |
| 2005/0144956 A1 | 7/2005 | Alkabie | |
| 2005/0247065 A1 | 11/2005 | Dudebout et al. | |
| 2006/0130486 A1 | 6/2006 | Danis et al. | |
| 2007/0125093 A1 | 6/2007 | Burd et al. | |
| 2008/0010992 A1 | 1/2008 | Patterson et al. | |
| 2008/0041059 A1 | 2/2008 | Teets | |
| 2008/0127651 A1* | 6/2008 | Zupanc | F23R 3/50 60/752 |
| 2008/0264064 A1 | 10/2008 | Sze et al. | |
| 2008/0276619 A1 | 11/2008 | Chopra et al. | |
| 2009/0100839 A1 | 4/2009 | Cazalens et al. | |
| 2009/0100840 A1 | 4/2009 | Campion et al. | |
| 2009/0120095 A1 | 5/2009 | Berry et al. | |
| 2009/0139239 A1 | 6/2009 | Zupanc et al. | |
| 2009/0142548 A1 | 6/2009 | Patterson et al. | |
| 2010/0077763 A1 | 4/2010 | Alkabie | |
| 2010/0218504 A1 | 9/2010 | Bronson et al. | |
| 2010/0257864 A1 | 10/2010 | Prociw et al. | |
| 2010/0287941 A1 | 11/2010 | Kim et al. | |
| 2011/0023495 A1 | 2/2011 | Bronson et al. | |
| 2011/0048024 A1 | 3/2011 | Snyder et al. | |
| 2011/0185736 A1 | 8/2011 | McKinney | |
| 2011/0203287 A1 | 8/2011 | Chila et al. | |
| 2011/0219774 A1 | 9/2011 | Bronson et al. | |
| 2011/0219779 A1* | 9/2011 | Critchley | F23R 3/343 60/773 |
| 2012/0017596 A1 | 1/2012 | Rudrapatna et al. | |
| 2012/0131923 A1 | 5/2012 | Elkady et al. | |
| 2012/0186222 A1 | 7/2012 | Commaret et al. | |
| 2012/0186256 A1 | 7/2012 | Dai et al. | |
| 2012/0285173 A1 | 11/2012 | Poyyapakkam et al. | |
| 2012/0297778 A1 | 11/2012 | Rudrapatna et al. | |
| 2012/0304647 A1 | 12/2012 | Dudebout et al. | |
| 2013/0025289 A1 | 1/2013 | Citeno et al. | |
| 2013/0031905 A1 | 2/2013 | Slobodyanskiy et al. | |
| 2013/0213046 A1 | 8/2013 | Melton | |
| 2013/0327057 A1 | 12/2013 | Cunha et al. | |
| 2014/0060060 A1 | 3/2014 | Bemero et al. | |
| 2014/0238024 A1 | 8/2014 | Kraemer | |
| 2014/0305095 A1 | 10/2014 | Inoue et al. | |
| 2015/0128607 A1 | 5/2015 | Lee | |
| 2016/0010856 A1 | 1/2016 | Biagioli et al. | |
| 2016/0305663 A1 | 10/2016 | Lebel | |
| 2017/0045226 A1* | 2/2017 | Cheung | F23R 3/002 |
| 2017/0050242 A1 | 2/2017 | Melton | |
| 2017/0058775 A1 | 3/2017 | Patel et al. | |
| 2017/0114798 A1 | 4/2017 | Spangler et al. | |
| 2017/0261964 A1 | 9/2017 | Meadows et al. | |
| 2017/0370584 A1 | 12/2017 | Boardman et al. | |
| 2017/0370585 A1 | 12/2017 | Boardman et al. | |
| 2017/0370588 A1 | 12/2017 | Boardman et al. | |
| 2018/0135520 A1* | 5/2018 | Lewis | F01D 9/023 |
| 2019/0120491 A1 | 4/2019 | Boardman et al. | |
| 2019/0120493 A1 | 4/2019 | Boardman et al. | |
| 2019/0212009 A1 | 7/2019 | Boardman et al. | |

FOREIGN PATENT DOCUMENTS

| | | |
|---|---|---|
| EP | 0780638 A2 | 6/1997 |
| EP | 2224170 A2 | 9/2010 |
| EP | 2479498 A2 | 7/2012 |
| FR | 2973479 A1 | 10/2012 |
| GB | 818634 A | 8/1959 |
| GB | 2571813 A | 9/2019 |
| JP | 2017/053523 A | 3/2017 |
| WO | WO2008/028621 A1 | 3/2008 |
| WO | WO2015/038293 A1 | 3/2015 |
| WO | WO2018/044367 A2 | 3/2018 |

(56) References Cited

FOREIGN PATENT DOCUMENTS

OTHER PUBLICATIONS

U.S. Appl. No. 15/793,104, filed Oct. 25, 2017.
Rizk et al., Low NOx Rich-Lean Combustion Concept Application, 27$^{th}$ Joint Propulsion Conference AIAA-91-1962, Jun. 24-26, 1991, 12 Pages.
Great Britain Office Action and Search Report Corresponding to Applicaiton No. 1915849 dated Apr. 29, 2020.

* cited by examiner

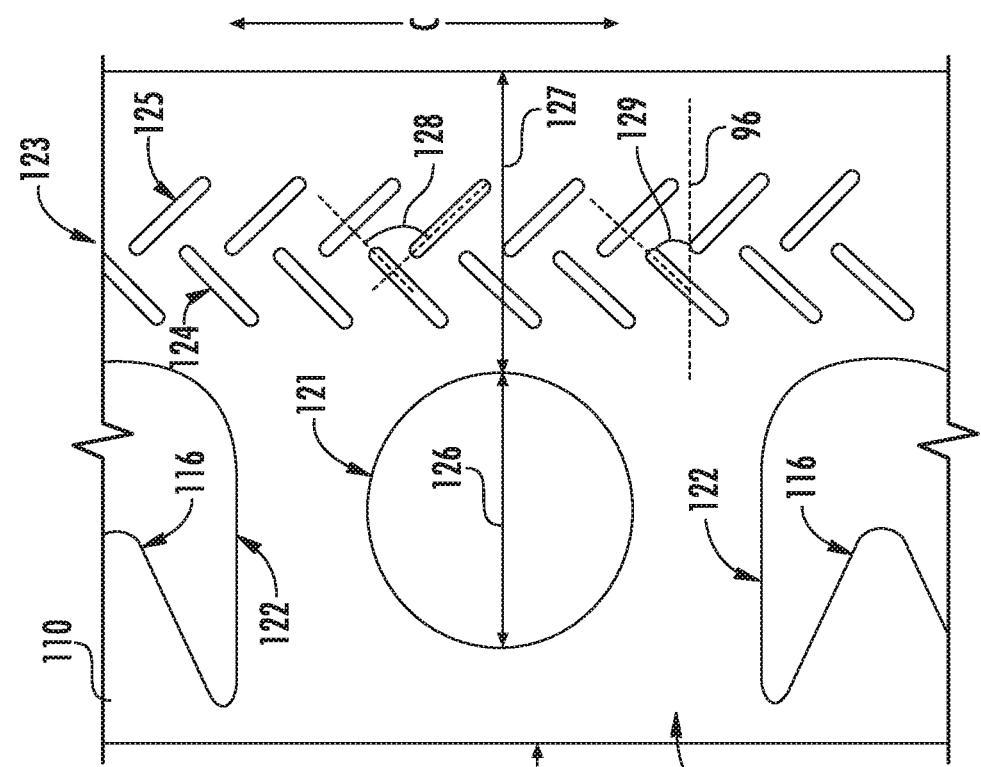
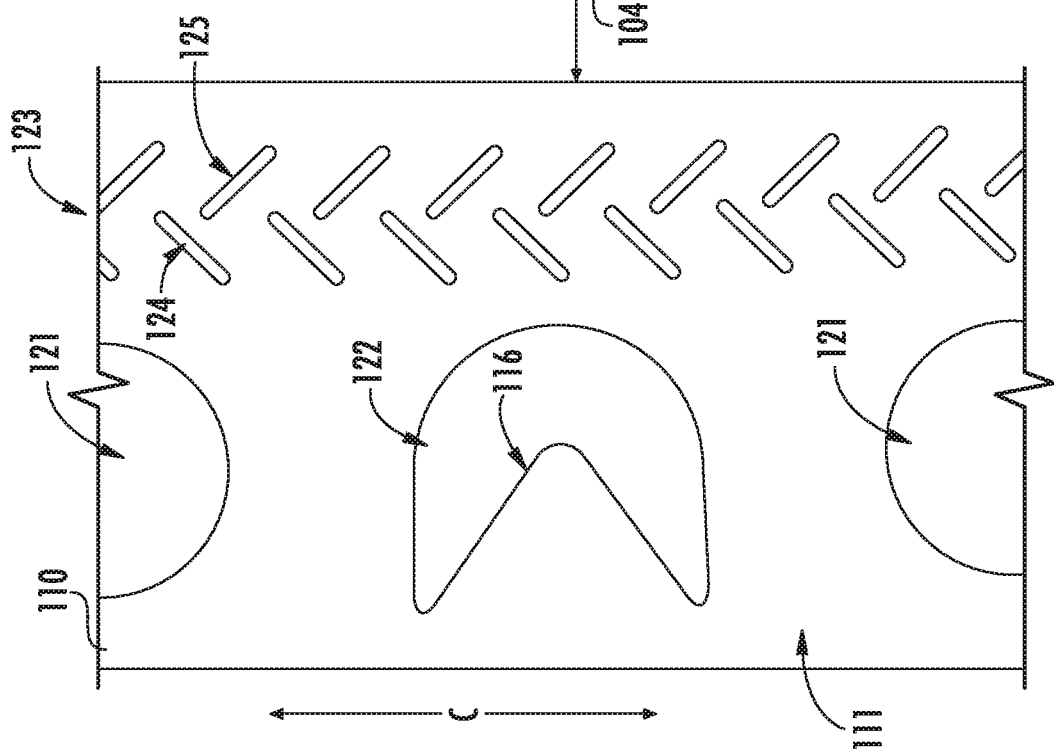

INVOLUTE TRAPPED VORTEX COMBUSTOR ASSEMBLY

FIELD

The present subject matter relates generally to combustion assemblies. More particularly, the present subject matter relates to trapped vortex combustor assemblies.

BACKGROUND

Gas turbine engines generally include combustion sections in which compressed air is mixed with a fuel and ignited to generate high pressure, high temperature combustion gases that then flow downstream and expand to drive a turbine section coupled to a compressor section, a fan section and/or a load device. Conventional combustion sections are challenged to burn a variety of fuels of various caloric values. Conventional combustion sections are also challenged to reduce emissions, such as nitric oxides, unburned hydrocarbons, and smoke, while also maintaining or improving combustion stability across a wider range of fuel/air ratios, air flow rates, and inlet pressures. Still further, conventional combustion sections are challenged to achieve any or all of these criteria while maintaining or reducing longitudinal and/or radial dimensions and/or part quantities.

Therefore, there exists a need for a combustion section that may improve emissions output and improve combustion stability across a wider range of fuel/air ratios, air flow rates, and inlet pressures while also reducing combustion section dimensions.

BRIEF DESCRIPTION

Aspects and advantages of the invention will be set forth in part in the following description, or may be obvious from the description, or may be learned through practice of the invention.

An aspect of the present disclosure is directed to a trapped vortex combustor assembly. The combustor assembly includes an inner liner wall extended annularly around a combustor centerline, and an outer liner wall extended annularly around the combustor centerline. The inner liner wall and the outer liner wall together define an involute wall extended at least partially as a spiral curve from a circumferential reference line around the combustor centerline. The involute wall defines an involute combustion chamber. One or more of the inner liner wall and the outer liner wall each define a first dilution opening and a shaped dilution opening.

In various embodiments, the first dilution opening and the shaped dilution opening are in alternating circumferential arrangement through the involute wall. In one embodiment, the first dilution opening and the shaped dilution opening are defined through the inner liner wall and the outer liner wall. In another embodiment, the first dilution opening through the inner liner wall is directly across the combustion chamber from the shaped dilution opening through the outer liner wall.

In still various embodiments, the involute wall defines a plurality of slotted openings in circumferential arrangement therethrough. In one embodiment, the plurality of slotted openings is disposed downstream of the first dilution opening and the shaped dilution opening. In another embodiment, the plurality of slotted openings is disposed downstream of the first dilution opening and the shaped dilution opening within three diameter-lengths of the first dilution opening. In yet another embodiment, the plurality of slotted openings defines a substantially herringbone pattern through one or more of the inner liner wall or the outer liner wall.

In still another embodiment, the plurality of slotted openings includes a plurality of first slotted opening in circumferential arrangement and a second slotted opening in circumferential arrangement disposed downstream of the first slotted opening. In one embodiment, the second slotted opening is disposed between approximately 75 degrees to approximately 105 degrees offset from the first slotted opening. In another embodiment, the first slotted opening is disposed between approximately 30 degrees and approximately 60 degrees offset relative to an axial reference line of the combustor assembly.

In various embodiments, the first dilution opening defines a substantially circular cross-sectional area. In still various embodiments, the shaped dilution opening defines a substantially U-shaped cross-sectional area, a substantially V-shaped cross-sectional area, or a substantially crescent-shaped cross sectional area, or combinations thereof.

In still various embodiments, the involute wall defines a shearing protrusion at the shaped dilution opening, wherein the shearing protrusion defines a shape of the shaped dilution opening. In one embodiment, the shearing protrusion at the volute wall defines a substantially triangular cross-sectional area.

In one embodiment, the combustor assembly defines a trapped vortex combustor assembly.

In another embodiment, the combustor assembly defines a primary combustion zone and a secondary combustion zone downstream of the primary combustion zone. The first dilution opening and the shaped dilution opening are each defined in fluid communication with the secondary combustion zone.

In various embodiments, the combustor assembly includes an outer shell substantially surrounding the involute wall defined by the inner liner wall and the outer liner wall. The involute wall is attached to the outer shell, and the outer shell defines a cooling opening therethrough in fluid communication with the involute wall. In one embodiment, the combustor assembly further includes an outer diffuser wall extended radially outward of the outer shell, and an inner diffuser wall extended radially inward of the outer shell. The outer diffuser wall and the inner diffuser wall together define a pressure vessel surrounding the outer shell and the involute wall.

Another aspect of the present disclosure is directed to a gas turbine engine including a trapped vortex combustor assembly. The combustor assembly includes an involute wall extended at least partially as a spiral curve from a circumferential reference line around a combustor centerline. The involute wall includes an inner liner wall and an outer liner wall each extended annularly around the combustor centerline. The involute wall defines an involute combustion chamber. The involute wall defines a first dilution opening therethrough and a shaped dilution opening therethrough. The first dilution opening and the shaped dilution opening each define cross sectional areas different from one another. The first dilution opening and the shaped dilution opening are in circumferential arrangement through the involute wall.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 3-4 are top-down views of portions of an involute wall of the combustor assembly of FIG. 2.

Figure 1:
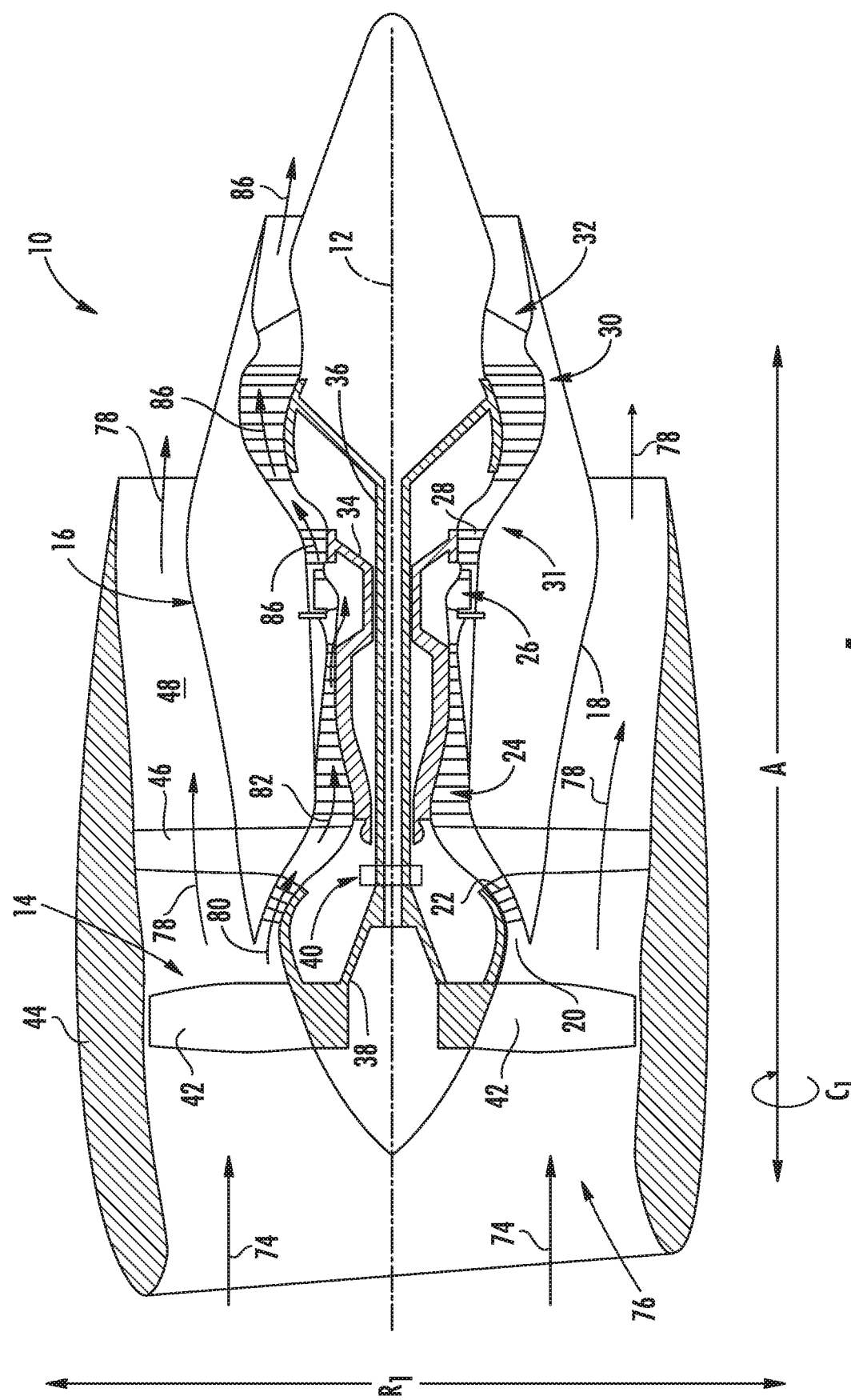
FIG. 1 is a schematic cross sectional view of an exemplary gas turbine engine incorporating an exemplary embodiment of a combustor assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of a combustion section that may improve emissions output and improve combustion stability across a wider range of fuel/air ratios, air flow rates, and inlet pressures while also reducing combustion section dimensions are generally provided. Embodiments generally provided herein include an involute trapped vortex combustor assembly providing rapid quenching of rich combustion gases with flows of oxidizer conditioned by alternating arrangements of a first dilution opening and a shaped dilution opening opposing the first dilution opening. The alternating arrangement of opposing first dilution opening and shaped dilution opening may mitigate formation of oxides of nitrogen by reducing or eliminating lower velocity stagnation zones at the combustion chamber. Embodiments of the combustion section may further include a plurality of slotted openings downstream of the alternating arrangement of first dilution opening and shaped dilution opening such as further reduce regions of relatively high formation of oxides of nitrogen and reduce wall temperatures such as to improve durability.

Referring now to the drawings, FIG. 1 is a schematic partially cross-sectioned side view of an exemplary gas turbine engine defining a high by-pass turbofan engine 10 herein referred to as "engine 10" as may incorporate various embodiments of the present disclosure. Although further described below with reference to a turbofan engine, the present disclosure is also applicable to gas turbine engines in general, including turbomachinery in general such as turbojet, turboprop, and turboshaft gas turbine engines, including marine and industrial turbine engines and auxiliary power units. The present disclosure is further applicable to propulsion systems for apparatuses including rockets, missiles, etc., such as ramjets, scramjets, etc. The engine 10 generally defines an axial direction A, a radial direction R1 relative to an axial centerline axis 12 extended there through for reference purposes, and a circumferential direction C1 extended relative to the centerline axis 12. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section 31 including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
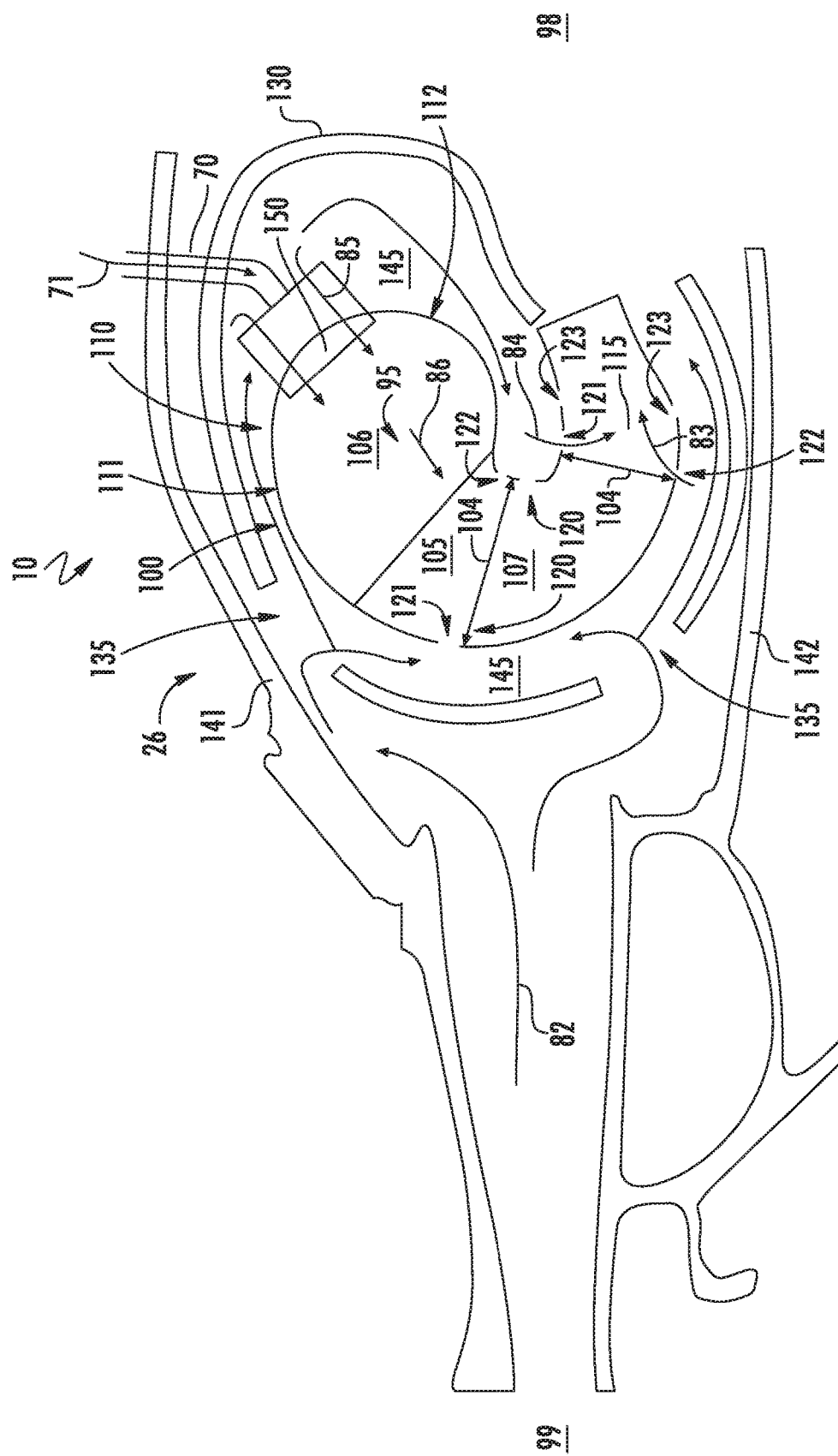
FIG. 2 is an axial cross sectional view of an exemplary embodiment of a combustor assembly of the combustion section of the gas turbine engine generally provided in FIG. 1.

Referring now to FIG. 2, an exemplary embodiment of the combustion section 26 is generally provided. The combustion section 26 includes a combustor assembly 100 defining an annular involute trapped vortex combustor assembly. The combustor assembly 100 includes an involute wall 110 extended at least partially as a spiral curve from a circumferential reference line 95 around a combustor centerline 11. In various embodiments, the combustor centerline 11 may be the same as the axial centerline axis 12 of the engine 10. In other embodiments, the combustor centerline 11 may be angled relative to the axial centerline axis 12 of the engine 10, or radially offset from the axial centerline axis 12, or both. The circumferential reference line 95 may therefore extend circumferentially around the combustor centerline 11, or additionally around the axial centerline axis 12.

The involute wall 110 of the combustor assembly 100 is extended annularly around the combustor centerline 11. The circumferential reference line 95 generally extends circumferentially through an involute combustion chamber 105 defined within the involute wall 110. The involute wall 110 includes an inner liner wall 111 and an outer liner wall 112 each extended annularly around the combustor centerline 11. The combustor assembly 100 may further include a mixer or swirler assembly 150 through which a fuel nozzle 70 is disposed and configured to provide a flow of liquid and/or gaseous fuel 71 therethrough to the combustion chamber 105. The swirler assembly 150 may generally include axial or radial vanes (not shown) configured to condition a portion of the flow of oxidizer 82, depicted via arrows 85, to mix with the fuel 71 and burn at the combustion chamber 105.

In various embodiments, the involute wall 110 of the combustor assembly 100 is substantially surrounded by an outer shell 130. The outer shell 130 may generally provide a mount structure to which the involute wall 110 of the involute combustor assembly 100 may be fixedly attached or otherwise coupled to the combustion section 26 and the engine 10. In one embodiment, such as depicted in regard to FIG. 2, the outer liner wall 112 is coupled to the outer shell 130 such as to support the involute wall 110 within the combustion section 26.

The outer shell 130 may generally condition or direct the flow of oxidizer 82 entering the combustion section 26 into the combustor assembly 100. The outer shell 130 may include an outer shell opening 135 through which the flow of oxidizer 82 enters within the outer shell 130. The outer shell 130 may generally define a pressure plenum 145 surrounding the involute wall 110 of the combustor assembly 100. In various embodiments, the outer shell 130 may further direct a portion of the flow of oxidizer 82, depicted via arrows 83 and 84, through dilution openings 120 defined through the inner liner wall 111 and the outer liner wall 112 of the involute wall 110. In one embodiment, the dilution openings 120 are defined through the involute wall 110 to provide fluid communication of the flow of oxidizer 83, 84 through the involute wall 110 to the combustion chamber 105. In one particular embodiment, such as generally provided in regard to FIG. 2, the dilution openings 120 provide fluid communication of the flow of oxidizer 83, 84 from the pressure plenum 145 to the combustion chamber 105.

The combustion section 26 generally includes a pressure vessel including an outer diffuser wall 141 extended radially outward of the outer shell 130 and the combustor assembly 100. The diffuser assembly further includes an inner diffuser wall 142 extended radially inward of the outer shell 130 and the combustor assembly 100. The outer diffuser wall 141 and the inner diffuser wall 142 together define the pressure vessel surrounding the outer shell 130 and the combustor assembly 100.

The combustion chamber 105 defined by the involute wall 110 may further be defined rotated toward a downstream end 98 of the combustion section 26 (e.g., rotated clockwise relative to the view provided in regard to FIG. 2). In various embodiments, the combustion chamber 105 is defined at least partially radially outward of the exit of the combustor assembly 100, such as radially outward of a first turbine vane or nozzle assembly, thereby providing a compact combustor assembly that may reduce weight, improve efficiency, and improve performance of apparatuses including the combustor assembly 100.

Referring now to FIGS. 2-5, embodiments of the involute wall 110 including the dilution openings 120 are generally provided. The dilution openings 120 include a first dilution opening 121 and a shaped dilution opening 122 each defined through the involute wall 110. In various embodiments, the first dilution opening 121 and the shaped dilution opening 122 are each defined through the inner liner wall 111 and the outer liner wall 112 of the involute wall 110. The first dilution opening 121 generally defines a different cross sectional area from the shaped dilution opening 122.

Figure 5:
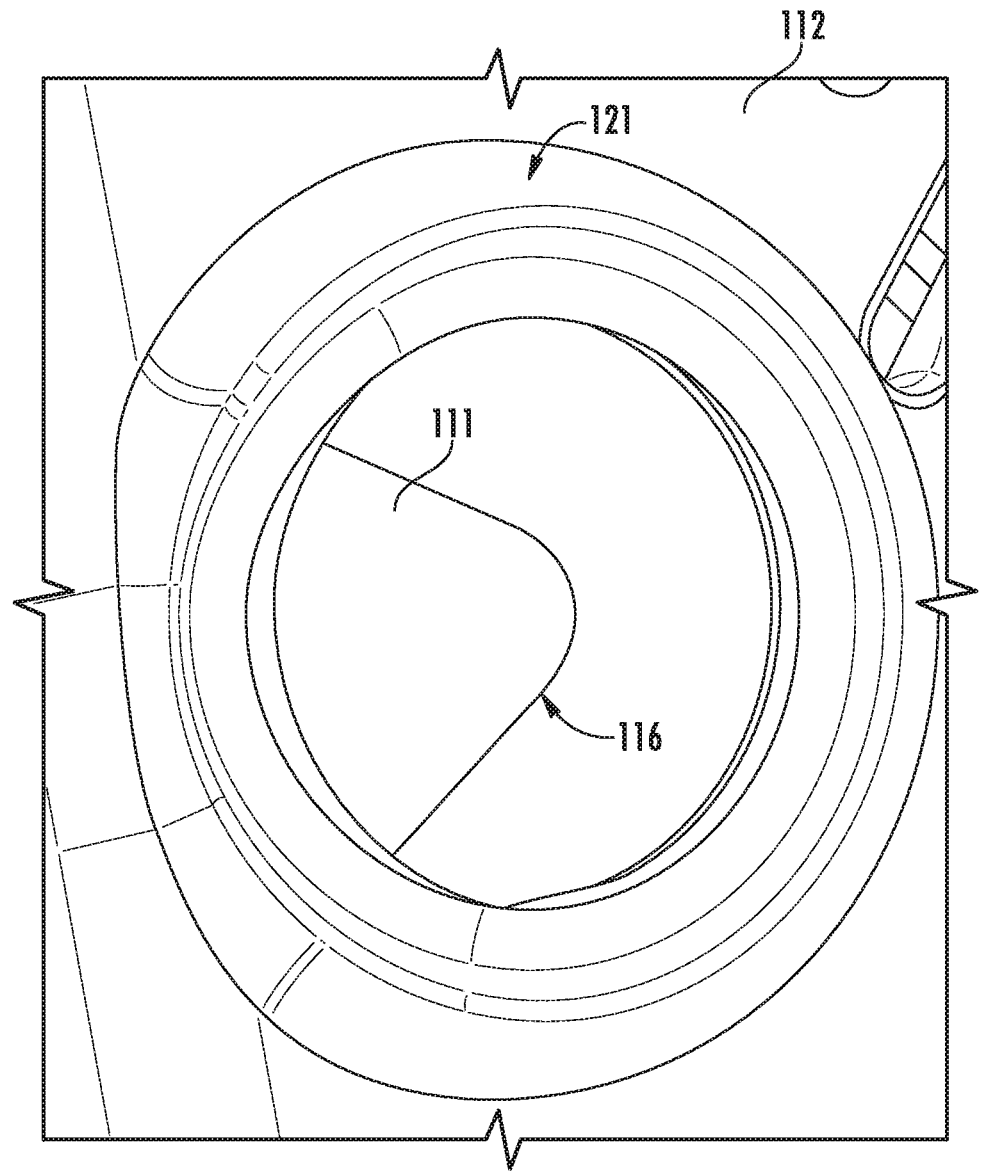
FIG. 5 is a perspective view of a portion of the involute wall of the combustor assembly of FIG. 2.

Referring to FIGS. 3-5, in various embodiments, the first dilution opening 121 defines a substantially circular cross sectional area. In still various embodiments, the shaped dilution opening 122 defines a substantially horseshoe or U-shaped cross-sectional area, a substantially V-shaped cross-sectional area, or a substantially crescent-shaped cross sectional area, or combinations thereof. In one embodiment, the involute wall 110 including the inner liner wall 111 and the outer liner wall 112 defines a shearing protrusion 116 at the shaped dilution opening 122 such as to define one or more of the cross sectional areas of the shaped dilution opening 122. In an embodiment, the shearing protrusion 116 defines a substantially triangular cross sectional area. However, in other embodiments the shearing protrusion 116 may generally define a rounded, ovular, or polygonal protrusion extended to the shaped dilution opening 122 such as to provide one or more of the substantially U-shaped cross sectional area, the V-shaped cross sectional area, or substantially crescent-shaped cross sectional area, or combinations thereof defining boundaries of the shaped dilution opening 120.

The shaped dilution opening 122 at the inner liner wall 111 or the outer liner wall 112 is defined directly across from an opposing first dilution opening 121 across the combustion chamber 105 at the outer liner wall 112 or the inner liner wall 111. For example, referring to FIG. 2, the first dilution opening 121 at the inner liner wall 111 is defined directly across the combustion chamber 105 from the shaped dilution opening 122 at the outer liner wall 112, such as depicted via line 104. Additionally, the first dilution opening 121 at the outer liner wall 112 is defined directly across the combustion chamber 105 from the shaped dilution opening 122 at the inner liner wall 111.

Referring to FIGS. 3-4, embodiments of portions of the inner liner wall 111 (FIG. 3) and a corresponding portion of the outer liner wall 112 (FIG. 4) across the combustion chamber 105 from the inner liner wall 111 are generally provided. The plurality of dilution openings 120 (FIG. 2) include the first dilution opening 121 in alternating arrangement along the circumferential direction C (i.e., corresponding to the direction of the circumferential reference line 95 in FIG. 2) with the shaped dilution opening 122. As further described above, each first dilution opening 121 is across from a corresponding shaped dilution opening 122, such as depicted along line 104.

Referring to FIG. 5, in conjunction with FIGS. 3-4, an exemplary perspective view of the first dilution opening 121 through the outer liner wall 112 is generally provided. The view through the first dilution opening 121 provided in regard to FIG. 5 further depicts the shear protrusion 116 portion of the inner liner wall 111 across the combustion chamber 105 from the outer liner wall 112 (e.g., such as further depicted at the first dilution opening 121 at the outer liner wall 112 of FIG. 4 relative to the shaped dilution opening 122 at the inner liner wall 111 of FIG. 3 across the combustion chamber 105 as depicted via line 104).

Referring to FIGS. 2-5, the flow of oxidizer 83, 84 into the combustion chamber 105 quenches at a secondary combustion zone 107 of the combustion chamber 105 the generally stoichiometrically rich combustion gases 86 from a primary combustion zone 106 of the combustion chamber 105, such as to define the trapped vortex combustor assembly 100 as a rich quench lean trapped vortex combustor assembly. The trapped vortex combustion process may occur at the primary combustion zone 106 before the combustion gases are quenched at the secondary combustion zone 107. In various embodiments, the dilution openings 120 are defined through the involute wall 110 corresponding to the secondary combustion zone 107 of the combustion chamber 105 defined by the involute wall 110.

The shaped dilution opening 122 may provide beneficially more uniform and homogenous quenching of the combustion gases 86 at the secondary combustion zone 107. As such, the shaped dilution opening 122 may beneficially lower the formation of oxides of nitrogen. Additionally, the circumferential arrangement of the first dilution opening 121 and the shaped dilution opening 122 through the involute wall 110, or more particularly the first dilution opening 121 arranged opposing across (e.g., depicted via line 104) the shaped dilution opening 122 may beneficially lower the formation of oxides of nitrogen by mitigating formation of a stagnation zone in a generally higher temperature region in the combustion chamber 105, such as depicted via region 115 between flows of oxidizer 83, 84 in the combustion chamber 105.

Various embodiments of the combustion section 26 provided herein provide a higher magnitude (e.g., scalar and/or velocity) penetration of the flow of oxidizer through the first dilution opening 121 (e.g., depicted via flow of oxidizer 84) in contrast to the flow of oxidizer through the shaped dilution opening 122 across (e.g., depicted via line 104) from the first dilution opening 121 (e.g., depicted via flow of oxidizer 83). For example, the shaped protrusion 116 defining the shaped dilution openings 122 may partially obstruct or otherwise partially retard the magnitude of flow of oxidizer through the shaped dilution opening 122 compared to the flow of oxidizer through the first dilution opening 121 across from the shaped dilution opening 122. The higher magnitude flow of oxidizer through the first dilution opening 121 may therefore improve quenching of the relatively high temperature region 115 such as to mitigate or reduce formation of oxides of nitrogen.

Referring back to FIGS. 2-4, the plurality of dilution openings 120 through the involute wall 110 may further include a plurality of slotted openings 123 in circumferential arrangement through the involute wall 110. It should be appreciated that the slotted openings 123 may generally define a racetrack-shaped opening, or generally a major axis and a minor axis, through one or more of the inner liner wall 111 or the outer liner wall 112.

Referring to FIG. 4, in various embodiments, the circumferential arrangement of the plurality of slotted openings 123 are disposed downstream (i.e., toward downstream end 98, or away from upstream end 99) of the circumferentially alternating arrangement of first dilution openings 121 and shaped dilution openings 122. The first dilution opening 121 may define a diameter 126 or major axis generally (e.g., in embodiments in which the first dilution opening may be ovular, elliptical, racetrack, etc.). The plurality of slotted openings 123 is disposed downstream of the circumferential arrangement of the first dilution opening 121 and the shaped dilution opening 122 within a diameter-length 127 from the circumferential arrangement of the first dilution opening 121 and the shaped dilution opening 122. The diameter length 127 is a distance corresponding to the diameter 126 of the first dilution opening 121. In various embodiments, the plurality of slotted openings 123 is disposed downstream of the first dilution opening 121 and the shaped dilution opening 122 within three diameter-lengths 127 of the first dilution opening 121. In another embodiment, the plurality of slotted openings 123 is defined downstream within one diameter length 127 of the first dilution opening 121 and the shaped dilution opening 122.

Disposition of the plurality of slotted openings 123 downstream of the circumferential arrangement of the first dilution opening 121 and the shaped dilution opening 122, such as within three or fewer diameter lengths 127 thereof, improves combustor assembly 100 durability by reducing the temperature of involute wall 110. Additionally, in various embodiments the plurality of slotted openings 123 defines a substantially herringbone pattern along the circumferential direction C through the involute wall 110. The herringbone pattern of the plurality of slotted openings 123 may further significantly lower combustion gas temperature via further improving quenching of the combustion gases 86 at the combustion chamber 105 as they flow downstream (i.e., toward the downstream end 98) of the first dilution openings 121 and the shaped dilution openings 122.

In various embodiments, the plurality of slotted openings 123 includes a plurality of first slotted opening 124 in circumferential arrangement and a plurality of second slotted openings 125 in circumferential arrangement. The second slotted openings 125 are disposed downstream of the plurality of first slotted openings 124. In one embodiment, such as depicted in regard to FIG. 4, the second slotted opening 125 is disposed at an angle 128 between approximately 75 degrees to approximately 105 degrees offset from the first slotted opening 124. In another embodiment, the second slotted opening 125 is disposed at the angle 128 approximately 90 degrees offset from the first slotted opening 124. In still another embodiment, the first slotted opening 124 is disposed at an angle 129 between approximately 30 degrees and approximately 60 degrees offset relative to an axial reference line 96 extended along a surface of the involute wall 110. In yet another embodiment, the first slotted opening 124 is disposed at the angle 129 at approximately 45 degrees relative to the axial reference line 96.

During operation of the engine 10, as shown in FIGS. 1-5 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26.

Referring still to FIGS. 1-5, the combustion gases 86 generated in the combustion chamber 105 flow from the combustor assembly 100 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust while outputting relatively lower levels of oxides of nitrogen and other emissions.

All or part of the combustor assembly 100 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustor assembly 100 separately or integral to one or more other portions of the combustion section 26. Furthermore, the combustor assembly 100 may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include high-strength steels, nickel and cobalt-based alloys, and/or metal or ceramic matrix composites, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly, the combustor assembly comprising:
    an inner liner wall extended annularly around a combustor centerline; and
    an outer liner wall extended annularly around the combustor centerline, wherein the inner liner wall and the outer liner wall together define an involute wall extended at least partially as a spiral curve from a circumferential reference line around the combustor centerline, wherein the involute will defines an involute combustion chamber therewithin, wherein the involute wall defines a first dilution opening therethrough and a shaped second dilution opening therethrough, the first dilution opening having a substantially circular cross section, and the shaped second dilution opening comprising a shearing protrusion defined by the involute wall, wherein the shaped second dilution opening has a concave shape, wherein the shearing protrusion defines the concave shape by extending into the shaped second dilution opening, and
    wherein the first dilution opening is directly opposed across the involute combustion chamber by the shaped. second dilution opening.

2. The combustor assembly of claim 1, wherein the involute wall comprises a plurality of the first dilution openings and a plurality of the shaped second dilution openings, wherein the plurality of first dilution openings and the plurality of shaped second dilution openings are in an alternating circumferential arrangement.

3. The combustor assembly of claim 2, wherein at least one of the plurality of the first dilution openings and at least one of the plurality of the shaped second dilution. openings are defined through the inner liner wall, and wherein the at least one of the plurality of first dilution openings and at least one of the plurality of shaped second dilution openings are defined through the outer liner wall.

4. The combustor assembly of claim 1, wherein the shaped second dilution opening has a substantially U-shaped cross-sectional area, a substantially V-shaped cross-sectional area, or a substantially crescent-shaped cross-sectional area.

5. The combustor assembly of claim 1, wherein the involute wall further defines a plurality of slotted openings in circumferential arrangement.

6. The combustor assembly of claim 5, wherein the plurality of slotted openings is disposed downstream of the first dilution opening and the shaped second dilution opening.

7. The combustor assembly of claim 6, wherein the plurality of slotted openings is disposed downstream of the first dilution opening and the shaped second dilution opening within three diameter-lengths of the first dilution opening relative to the first dilution opening.

8. The combustor assembly of claim 5, wherein the plurality of slotted openings defines a substantially herringbone pattern through one or both of the inner liner wall or the outer liner wall.

9. The combustor assembly of claim 5, wherein the plurality of slotted openings comprises a plurality of first slotted openings in circumferential arrangement and a plurality of second slotted openings in circumferential arrangement disposed downstream of the first slotted opening.

10. The combustor assembly of claim 9, wherein the plurality of second slotted openings are disposed between approximately 75 degrees to approximately 105 degrees offset from the plurality of first slotted openings.

11. The combustor assembly of claim 10, wherein the plurality of first slotted openings are disposed between approximately 30 degrees and approximately 60 degrees offset relative to an axial reference line of the combustor assembly.

12. The combustor assembly of claim 1, wherein the shearing protrusion defines a substantially triangular cross-sectional area.

13. The combustor assembly of claim 1, wherein the combustor assembly defines a trapped vortex combustor assembly.

14. The combustor assembly of claim 1, wherein the combustor assembly defines a primary combustion zone and a secondary combustion zone downstream of the primary combustion zone, and wherein the first dilution opening and the shaped second dilution opening are each defined in fluid communication with the secondary combustion zone.

15. The combustor assembly of claim 1, further comprising: an outer shell substantially surrounding the involute wall, wherein the involute wall is attached to the outer shell, and wherein the outer shell defines a cooling opening therethrough in fluid communication with the involute wall.

16. The combustor assembly of claim 15, further comprising:
    an outer diffuser wall extended radially outward of the outer shell; and
    an inner diffuser wall extended radially inward of the outer shell, wherein the outer diffuser wall and the inner diffuser wall together define a pressure vessel surrounding the outer shell and the involute wall.

17. A gas turbine engine, the gas turbine engine comprising:

a trapped vortex combustor assembly, wherein the trapped vortex combustor assembly comprises:

an involute wall extended at least partially as a spiral curve from a circumferential reference line around a combustor centerline, wherein the involute wall comprises an inner liner wall and an outer liner wall each extended annularly around the combustor centerline; and wherein the involute wall defines an involute combustion chamber, and further wherein the involute wall defines a first dilution opening, therethrough and a shaped second dilution opening, therethrough, wherein the first dilution opening and the shaped second dilution opening are in circumferential arrangement around the involute wall and are opposed to one another directly across the involute combustion chamber, the first dilution opening having a substantially circular cross section, and the shaped second dilution opening comprising a shearing protrusion defined by the involute wall, wherein the shaped second dilution opening has a concave shape, and wherein the shearing protrusion defines the concave shape by extending into the shaped second dilution opening.

18. The gas turbine engine of claim 17, wherein the shaped second dilution opening having a substantially U-shaped cross-sectional area, a substantially V-shaped cross-sectional area, or a substantially crescent-shaped cross-sectional area.

* * * * *